Nov. 21, 1967     D. J. BLATTNER     3,353,896

LIGHT FREQUENCY SHIFTER

Filed June 12, 1963

INVENTOR.
DONALD J. BLATTNER
BY
Attorney

United States Patent Office 3,353,896
Patented Nov. 21, 1967

3,353,896
LIGHT FREQUENCY SHIFTER
Donald J. Blattner, Princeton, N.J., assignor to Radio Corporation of America, a corporation of Delaware
Filed June 12, 1963, Ser. No. 287,253
4 Claims. (Cl. 350—160)

This invention relates to an improved laser, or optical maser, system. In particular, this invention relates to a novel method of and means for controlling and shifting the frequency of a coherent light beam.

The term laser is used to refer to a device which provides "light amplification by stimulated emission of radiation." The laser device is, at present, used as a source of coherent light.

In general, a laser includes one or more active materials, which will produce stimulated emission of radiation, and a pumping source which pumps power into the active material. Usually, it is desirable for feedback purposes, to position the active material in a resonant structure, such as an optical resonant cavity, tuned to the radiation frequency.

The active material of a laser has two energy levels, or atomic states, separated in energy by an amount corresponding to a characteristic output frequency. The active material includes atoms which are characterized by the properties that: (1) orbital electrons, or ions, of the atoms may be excited into the higher of two energy levels, and thus an inverted population density condition may be established, and (2) when the orbital electrons return to the lower energy level, the active material emits light. The emitted light is such that, within the active laser material, an incident photon stimulates an excited atom to emit another photon in phase with the incident photon. Thus, ideally, all of the emitted light is substantially in phase and is described as coherent light.

The pumping source is a source of energy used to excite the electrons or ions in the active material to the higher energy level. The pumping source may comprise for example, an RF field for an electrically pumped laser, or a light source, such as a xenon flash tube, for an optically pumped laser.

In order to resonate the stimulated light, a resonant structure, or resonant cavity is used. The resonant cavity normally includes two light reflecting surfaces, such as mirrors, positioned adjacent to the ends of the active laser material. At least a portion of one of the light reflecting surfaces is partially transparent so that output light may be obtained from the laser through the partially transparent surface. The light reflecting surfaces are precisely oriented and spaced so that a resonant mode will exist between the mirrors at frequencies for which the spacing between mirrors corresponds to a path length of an integral number of half wavelengths of the light frequency emitted.

The laser device, briefly described above, provides a beam of coherent light having a predetermined frequency or wavelength. A means to shift the wavelength or frequency, of the coherent light beam, by a controlled amount, would enhance the usefulness of a laser device. For example, a controlled frequency shifter is desirable for a Doppler radar system. A Doppler radar system detects a change in frequency, or change in wavelength, of the signal returning from a moving object under surveillance. Because this returning signal may be any frequency, within an extremely broad band of frequencies, for high accuracy it is necessary, for example, that the detector of the returning signal be capable of handling an extremely broad frequency band, or that some type of accurately controlled frequency null detector system be used.

Detectors capable of accurately detecting a frequency change throughout an extremely broad band of frequencies are difficult to construct and are expensive. Therefore, the easiest and least expensive method of detecting a particular frequency, of a returning light signal, is to compare the returning signal with a controllably variable frequency standard, and adjust the frequency of the standard until a null is obtained. When this is done, a reading of the frequency of the standard may be made which is an accurate representation of the speed of the moving object. To produce this result, an accurate light frequency shifter is desirable.

It is therefore an object of this invention to provide an improved light frequency shifter.

It is another object of this invention to provide a novel means for shifting the frequency of a coherent light beam.

It is a further object of this invention to provide an improved optical frequency shifter useful in an optical Doppler radar system.

These and other objects of this invention are accomplished by directing a coherent light beam from a laser through an electro-optic cell, or frequency modulator at the same time as a linearly changing voltage is applied to the electro-optic cell. The electro-optic cell includes a material having an index of refraction that is proportional to the voltage applied to the cell. When the applied voltage is changing, the index of refraction will also be changing. An example of a linearly changing voltage is a sawtooth waveform. The change in voltage, with respect to time, produces a change in the index of refraction with respect to time producing a frequency, or wavelength, shift in the coherent light beam passing out of the electro-optic cell. The more rapid the change in voltage, the greater will be the resultant frequency shift. Depending upon the relative orientation of the electro-optic crystal axis and the direction of the light beam one polarity change in voltage produces a higher frequency while the opposite polarity change in voltage produces a lower frequency. For different relative orientations, the opposite will be true. When used in a Doppler radar system, the frequency shifted light beam, and the light beam returning from an object under surveillance, may be mixed to accurately and economically determine the null point and thus the frequency.

The invention will be described in greater detail by reference to the accompanying drawings wherein.

Similar reference characters refer to similar elements throughout the drawings.

Figure 1:
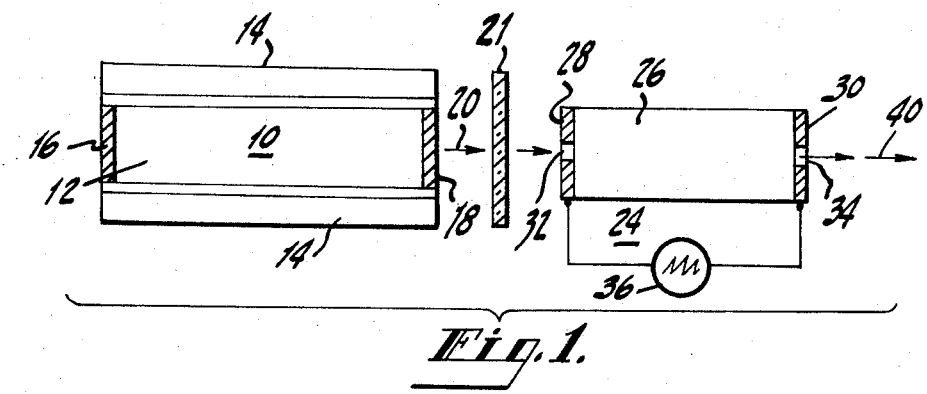
FIG. 1 is a partially schematic view of an embodiment of a laser and a frequency shifter system in accordance with this invention.
Figure 2:
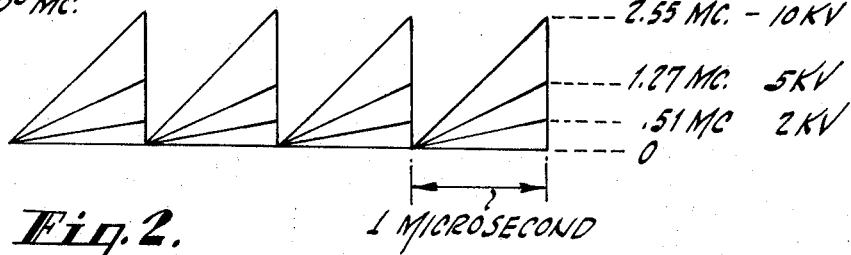
FIG. 2 is a schematic illustration of the waveform of potentials applied to the electro-optic light modulator used in the system of FIG. 1; and, FIG. 3 is a partially schematic view of another embodiment of this invention.

FIG. 1 shows an apparatus 10 for producing coherent radiation. When the coherent radiation is in the light spectral range, the device 10 is known as a laser. The laser 10 comprises an active material 12, a pumping source 14 and a pair of optical reflecting surfaces 16 and 18 which define the opposite ends of an optical resonant cavity.

The active material 12 may comprise a substance which has two atomic states, or energy levels, separated by an amount corresponding to a characteristic frequency of the active material 12. The active laser material 12 has the property of being excitable into an inverted population density condition, i.e. the property that an excess population of ions can be established in the upper energy state. The active material 12 emits substantially coherent radiation as the atomic particles return from the higher energy level to a lower energy level. A specific example of an active material 12 which exhibits laser action is calcium fluoride doped with divalent dysprosium. Another example of an active material 12, which is known to exhibit laser action, is a gallium arsenide P-N junction.

The pumping source 14 may comprise any source of energy which is capable of exciting the atomic particles in the active material 12 from a lower energy level into the desired higher energy level. Thus, the pumping source 14 is a source of radiation which is capable of establishing the inverted population density condition in the active material 12. Examples of such pumping sources are a means for providing an RF field, a xenon flash tube, or other suitable known types of energy sources. When the P-N junction type of active material 12 is used, the active material may be electrically pumped by a power source connected to the electrodes of the junction.

The active material 12 is positioned in an optical resonant cavity. Thus, adjacent to the ends of the active material 12 are light reflecting mirrors 16 and 18. One of the mirrors, e.g. light reflecting device 18, is made so that at least a portion thereof is partially transparent, e.g. 10%, so that an output coherent light beam 20 may be obtained from the device 10. When the active material 12 is made of certain materials, e.g. gallium arsenide, the ends of the P-N junction may be optically flat and/or polished, and the air interface will function as a light reflecting surface.

The coherent light beam 20 is of one particular frequency, or wavelength. For example, when the active material 12 is calcium fluoride doped with divalent dysprosium, the light beam 20 will be of an approximate wavelength of 2.36 microns. For certain active laser materials, the output beam 20 is linearly polarized. If this is not the case, a properly oriented linear polarizer 21, such as a Nicoll prism, is positioned in the path of the light beam 20.

The linearly polarized coherent light beam 20 is then passed through an electro-optic cell 24. The electro-optic cell 24 comprises a material 26 having an index of refraction that is a function of the applied voltage. The material 26 may comprise a solid, such as crystal of cuprous chloride or zinc sulphide or the dihydrogen phosphates; or a liquid, such as nitrobenzene.

The material 26 is positioned between a pair of electrodes 28 and 30. The electrodes 28 and 30 are shown as being positioned on the ends of the material 26, and therefore in the path of the light beam 20. Therefore, the electrodes 28 and 30 should be transparent to the light beam 20. Transparent electrode materials are known, such as tin oxide, or thin gold, and any of the known materials may be used. Also, opaque electrodes, such as copper, may be used with relatively small apertures 32 and 34 in each of the electrodes. The apertures 32 and 34 may be quite small to place the electric field adjacent to the light beam path.

Connected between the electrodes 28 and 30 is a source 36 of linearly changing voltage. An example of a linearly changing voltage is a sawtooth voltage having a flyback time that is short as compared to the rise time. The source 36 is illustrated as a positive sawtooth voltage, i.e. linearly increasing, but may as will be explained, be a negative sawtooth or other linearly decreasing voltage.

As the light beam 20 passes through the member 26, with the linearly changing voltage applied, the phase and therefore the frequency of light beam 40 passing out of the member 26 is varied. For every direction of light travel through the crystal 26, there is a "fast" and a "slow" axis which are at right angles to each other. A light beam which is polarized along the "fast" axis will have its velocity increased when one polarity of electric field is applied, while a light beam which is polarized along the "slow" axis will be delayed by the application of the same polarity electric field. Thus, assuming a beam polarized along the "fast" axis, with a positively changing voltage, the output beam 40 has a higher frequency than the input light beam 20. With a negatively changing voltage, the output beam 40 will be a lower frequency. The opposite changes result if polarized along the "slow" axis. The amount of frequency, or wavelength, change is proportional to the rate of change of voltage, i.e. the slope of the sawtooth voltage waveform.

The frequency of the light emerging from the crystal is given by its rate of phase change at the output.

$$f_{out} = \frac{d\phi_{out}}{dt} \qquad (1)$$

But the light phase at the output, $\phi_{out}$, is $$\phi_{out} = \phi_{in} + \phi_{xtl} \qquad (2)$$

where $\phi_{in}$ is the phase of the light entering the crystal, and $\phi_{xtl}$ is the phase shift of the light in traveling through the crystal. Differentiating (2), $$\frac{d\phi_{out}}{dt} = \frac{d\phi_{in}}{dt} + \frac{d\phi_{xtl}}{dt} \qquad (3)$$

or $$f_{out} = f_{in} + \frac{d\phi_{xtl}}{dt} \qquad (4)$$

Equation 4 shows that the frequency of the light emerging from the crystal is different than the frequency of the light entering the crystal if $\phi_{xtl}$ is varied. The frequency difference is $$\Delta f = \frac{d\phi_{xtl}}{dt} \qquad (5)$$

The phase shift of the light in traveling through the crystal is $$\phi_{xtl} = \frac{2\pi p f n}{c} \qquad (6)$$

where
 $p$ = Thickness of crystal in direction light travels
 $f$ = Frequency of incident light
 $c$ = Velocity of light in free space
 $n$ = Index of refraction of the crystal.

Therefore, since $n$ is a function of voltage for the crystals of interest here, $$\Delta f = \frac{d\phi_{xtl}}{dt} = \frac{2\pi p f}{c} \frac{dn}{dt} \qquad (7)$$

If $$n = n_0 + KV \qquad (8)$$

where V is the voltage applied to the crystal, then $$\Delta f = \frac{2\pi p f K}{c} \frac{dV}{dt} \qquad (9)$$

Thus application of a linearly-changing voltage will produce a frequency change proportional to $dV/dt$. The practical form for this linearly increasing voltage is a sawtooth voltage, with flyback time short compared to rise time.

The change in light frequency given by 9 can also be expressed as a change in wavelength:

$$\Delta\lambda = -\frac{c\Delta f}{f^2} = -\frac{2\pi pK}{f}\frac{dV}{dt} \quad (10)$$

From the Equations 8 and 9 above, it is seen that the amount of frequency shift is also related to material selected as the body 26, i.e. the factor K in Equations 8 and 9. Thus, for larger frequency shifts, with smaller potentials applied, materials are selected for use as the body 26 having a large K. The K for certain known materials are as follows with the ± indicating that either the "fast" or "slow" axis may be used.

| K (MKS units) | Materials |
| --- | --- |
| ±2.44/p×10⁻¹¹ | CuCl (V along light directions). |
| ±2.82/d×10⁻¹¹ | CuCl (V across light directions). |
| ±1.81/d×10⁻¹¹ | KDP (V across light directions). |
| ±1.81/p×10⁻¹¹ | KDP (V along light directions). |
| ±1.38/p×10⁻¹¹ | ZnS (V along light directions). |
| ±1.59/d×10⁻¹¹ | ZnS (V across light directions). |
| ±1.49/d×10⁻¹¹ | ADP (V across light directions). |
| ±1.49/p×10⁻¹¹ | ADP (V along light directions). | where $d$ = the thickness of the crystal, transverse to the light path and measured between transverse electrodes.

As a specific example, assuming that body 26 comprises cuprous chloride 2 cm. long in the direction of light travel, and ½ cm. thick, input light at 6000 A. will be shifted by 2.55 mc. when a sawtooth voltage of 10 kilovolts and a rise time of 1 microsecond is applied to the electrodes 28 and 30, i.e. V along direction of light. If V is applied transversely, $\Delta f = 10.2$ mc. for this example.

Figure 3:
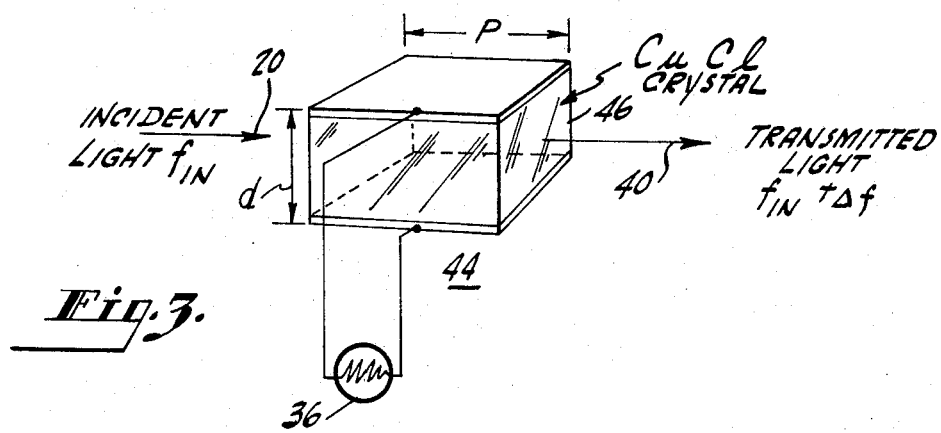

FIG. 3 is similar to FIG. 1 except that the direction the light travels through an electro-optic cell 44 is normal to the applied electric field. In this embodiment, the body 46, is made of a material in which the index of refraction is a function of the applied voltage. As has been explained, the applied voltage is a linearly changing, either increasing or decreasing, voltage.

The frequency shifted light beam 40 may be used in any desired system. For example, the frequency shifter beam may be mixed with a return beam from an object under surveillance in a Doppler radar system to determine a null, and therefore the frequency of the return light beam. In this system a means, such as a beat frequency meter should be provided to adjust the rate of the linear change of voltage that is provided by the source 36.

What is claimed is:

1. Optical apparatus comprising a source of light of a predetermined first fixed frequency, means for phase modulating light from said source with a linear signal having a given slope applied thereto to produce therefrom output light of a second fixed frequency which differs from said first frequency by an amount which is proportional to the value of said given slope, and means for applying a linear signal having said given slope to said means for phase modulating light.

2. The apparatus defined in claim 1, wherein said means for applying a linear signal includes means for adjusting the value of said slope to thereby control said second frequency.

3. The apparatus defined in claim 1 wherein said means for phase modulating includes an electro-optic crystal through which said light from said source is passed, and said means for applying a linear signal includes saw-tooth voltage means for applying an electric field to said crystal.

4. The apparatus defined in claim 3, wherein said saw-tooth voltage means includes means for adjusting the slope thereof.

References Cited
UNITED STATES PATENTS

| | | | |
| --- | --- | --- | --- |
| 3,055,258 | 9/1962 | Hurvitz | 250—199 |
| 3,233,108 | 2/1966 | Rosenblum | 250—199 |
| 3,237,011 | 2/1966 | Sterzer | 250—199 |
| 3,243,722 | 3/1966 | Billings | 331—94.5 |

JEWELL H. PEDERSEN, *Primary Examiner.*

RONALD L. WIBERT, *Examiner.*